United States Patent [19]

Merritt et al.

[11] Patent Number: 4,594,707
[45] Date of Patent: Jun. 10, 1986

[54] HIGH SPEED LIMITED DISTANCE MULTIPLEXED DATA COMMUNICATIONS MODEM USING A SINGLE TWISTED PAIR OF CONDUCTORS

[75] Inventors: John W. Merritt, Austin; Henry Wurzburg, Round Rock; Stephen H. Kelley, Austin, all of Tex.

[73] Assignee: Motorola, Inc., Schaumburg, Ill.

[21] Appl. No.: 650,945

[22] Filed: Sep. 17, 1984

[51] Int. Cl.⁴ .............................................. H04J 3/00
[52] U.S. Cl. ....................................... 370/91; 370/79
[58] Field of Search ................... 370/91, 80, 102, 112, 370/79

[56] References Cited

U.S. PATENT DOCUMENTS

| | | | |
|---|---|---|---|
| 4,310,922 | 1/1982 | Lichtenberger et al. | 370/91 |
| 4,325,147 | 4/1982 | Rothlauf | 370/91 |
| 4,547,880 | 10/1985 | DeVita et al. | 370/91 |

OTHER PUBLICATIONS

Proceedings of the National Electronics Conf., vol. XXXVII, "A Low Cost, High Performance Single Chip CMOS IC for Digital Subscriber Loops," by H. Wurzburg.

Primary Examiner—Douglas W. Olms
Assistant Examiner—Kenneth I. Rokoff
Attorney, Agent, or Firm—Anthony J. Sarli, Jr.; Jeffrey Van Myers; Robert L. King

[57] ABSTRACT

A multiplexed data communications modem providing high speed data communication via a single twisted pair of conductors having a distance up to two kilometers between a plurality of data terminals and remote communications equipment is provided. A burst mode ping-pong transmission scheme is utilized. A control portion selectively multiplexes data from each data terminal, and the variation of actual data rate of each data terminal has no effect on channel capacity of the other multiplexed data channels. A plurality of data interface circuits provides an asynchronous/synchronous interface between the multiplexed data terminals and a synchronous transceiver.

12 Claims, 3 Drawing Figures

HIGH SPEED LIMITED DISTANCE MULTIPLEXED DATA COMMUNICATIONS MODEM USING A SINGLE TWISTED PAIR OF CONDUCTORS

CROSS REFERENCE TO RELATED APPLICATION

This application is related to the following copending applications assigned to the assignee hereof:
1. "An Interface Circuit for Interfacing Between Asynchronous Data in Start/Stop Format and Synchronous Data", Ser. No. 625,870, now U.S. Pat. No. 4,569,062; and
2. "A Simultaneous Voice and Asynchronous Data Telephone", Ser. No. 625,871.

TECHNICAL FIELD

This invention relates generally to data communications modems and, more particularly, to a high speed limited distance modem having multiple input channels and using a single twisted pair of conductors.

BACKGROUND OF THE INVENTION

Data communication systems typically utilize modems when data terminals communicate. With the advance of office automation equipment has come local area networks (LANs) having a plurality of data terminals which are capable of communicating with each other. Instead of using multiple modems, others have multiplexed several data terminals with a single modem by using a statistical multiplexer. Such statistical multiplexers typically couple a plurality of data terminals at 9600 baud per second via multiple input terminals and couple the data to a single output terminal where the data is outputted at 9600 baud per second. A statistical multiplexer functions by constantly scanning all input terminals. When data is identified at any of the input terminals, the data is stored and sequentially outputted at 9600 baud per second with some type of identifier to identify the origin terminal. At a receive terminal, a statistical demultiplexer is required to identify the origin of the data and to properly route the received data. One of several problems associated with statistical modems is the fact that each data terminal is frequency limited. In other words, each data terminal cannot provide continuous data to the modem at 9600 baud without the modem losing a portion of the data. Because statistical multiplexers rely upon statistical properties of data from a data source, usually data is not lost since large blocks of data can be stored if sufficient memory storage exists. However, each channel of data is frequency limited by the data rate of other data channels.

SUMMARY OF THE INVENTION

Accordingly, an object of the present invention is to provide an improved high speed limited distance multiplexed data communications modem.

Another object of the present invention is to provide an improved data communications modem for simultaneously receiving data from multiple data sources which each have a programmable channel capacity independent of the data rates of all other coupled data sources.

Yet another object of the present invention is to provide an improved multiplexed data communications modem using a single twisted pair of conductors.

In carrying out the above and other objects of the present invention, there is provided, in one form, a multiplexed data communications modem having a plurality of data sources or terminals. Each data source has a data node for providing and receiving data asynchronously at predetermined data rates. A plurality of interface circuits are provided by having a first terminal of each interface circuit coupled to a data node of a predetermined data source for asynchronously communicating data between the data source and the interface circuit. A second terminal of each interface circuit synchronously provides data from the asynchronous data source in response to a first control signal. A third terminal of each interface circuit synchronously receives data from a remote data location in response to a second control signal. Transceiver means are coupled to the interface circuits for synchronously coupling data between the interface circuits and the remote data location. Control means are coupled to both the interface circuit and the transceiver means for providing the first and second control signals which selectively multiplex and demultiplex data coupled between predetermined ones of the data sources and the remote data location. Variation of data rates of each data source has no effect on the data channel capacity of other data sources.

DETAILED DESCRIPTION OF THE INVENTION

Figure 1:
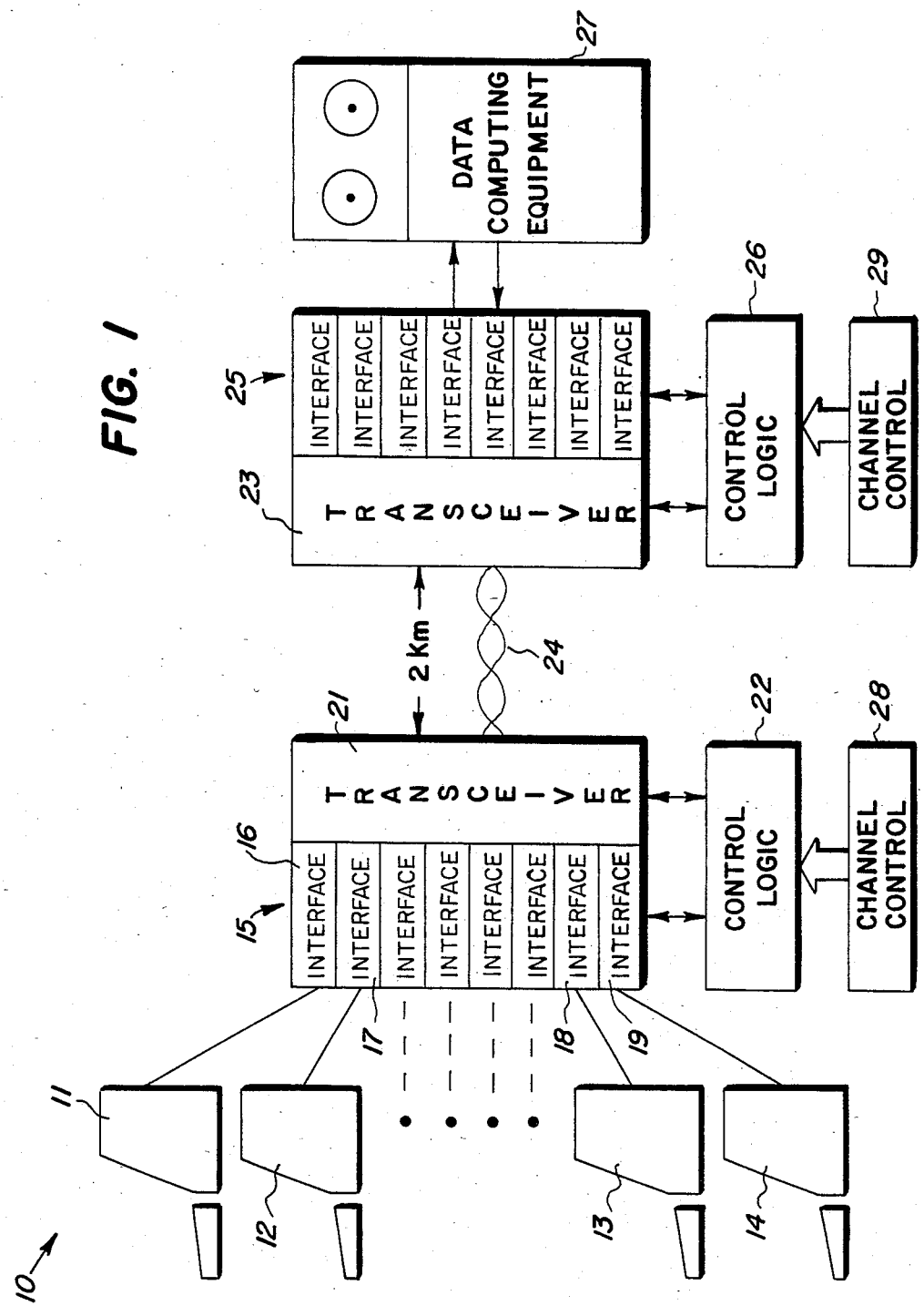
FIG. 1 illustrates in block diagram form a data communications system using a high speed multiplexed data communications modem in accordance with the present invention.

Shown in FIG. 1 is a data communications system 10 having a plurality of N data terminals including data terminals or sources 11, 12, 13 and 14, where N is an integer. Each of the N data terminals are coupled to a predetermined one of N interface circuits 15. Data terminals 11, 12, 13 and 14 are coupled to interface circuits, 16, 17, 18 and 19, respectively. Each of the N interface circuits are multiplexed to a first data node of a transceiver 21. A control logic circuit 22 is coupled to each of the N interface circuits including circuits 16, 17, 18 and 19 and to transceiver 21. A second data node of transceiver 21 is coupled to a first data node of a second transceiver 23 via a single twisted pair of conductors 24. A second data terminal of transceiver 23 is coupled to a plurality of N interface circuits 25. A control logic circuit 26 is coupled to both transceiver 23 and the plurality of N interface circuits 25. Data computing equipment 27 is coupled to the plurality of N interface circuits 25. Data computing equipment 27 may be any type of equipment including a central host processing unit, a printer, a disk drive or a computer. Channel control circuits 28 and 29 are coupled to control logic circuits 22 and 26, respectively.

In operation, each of the N data sources 11, 12, 13 and 14 provides asynchronous data. The asynchronous data is converted to a synchronous format and is transmitted from transceiver 21 to transceiver 23 at a high speed synchronous rate. The N interface circuits including interface circuits 16, 17, 18 and 19 each convert asynchronous data to a synchronous data format. Transceivers 21 and 23 both synchronously receive and provide data via the twisted pair 24. Transceiver 23 synchronously receives and provides multiplexed data to the plurality of interface circuits 25. Data is both multiplexed and demultiplexed by the modems located at both ends of the twisted pair 24. The plurality of interface circuits 25 function to communicate asynchronous data with data computing equipment 27 and to communicate synchronous data with transceiver 23. Channel control circuits 28 and 29 function to programmably vary the channel capacity of any of the data channels coupled to the plurality of interface circuits 15 and 25, respectively, as explained below. One of many possible implementations of each of the plurality of interface circuits 15 and 25 is the interface circuit taught in U.S. Pat. No. 4,569,062 cross referenced above which teaches a data set interface (DSI) circuit. Also, one of many embodiments of transceivers 21 and 23 which may be used in conjunction with the present invention is taught in U.S. Pat. No. 4,432,089 and assigned to the assignee hereof. An example of a modified differential phase shift keying modulation technique which may be used in conjunction with the present invention in a burst mode ping-pong data transmission scheme is taught in U.S. Pat. No. 4,435,824 assigned to the assignee hereof.

Figure 2:
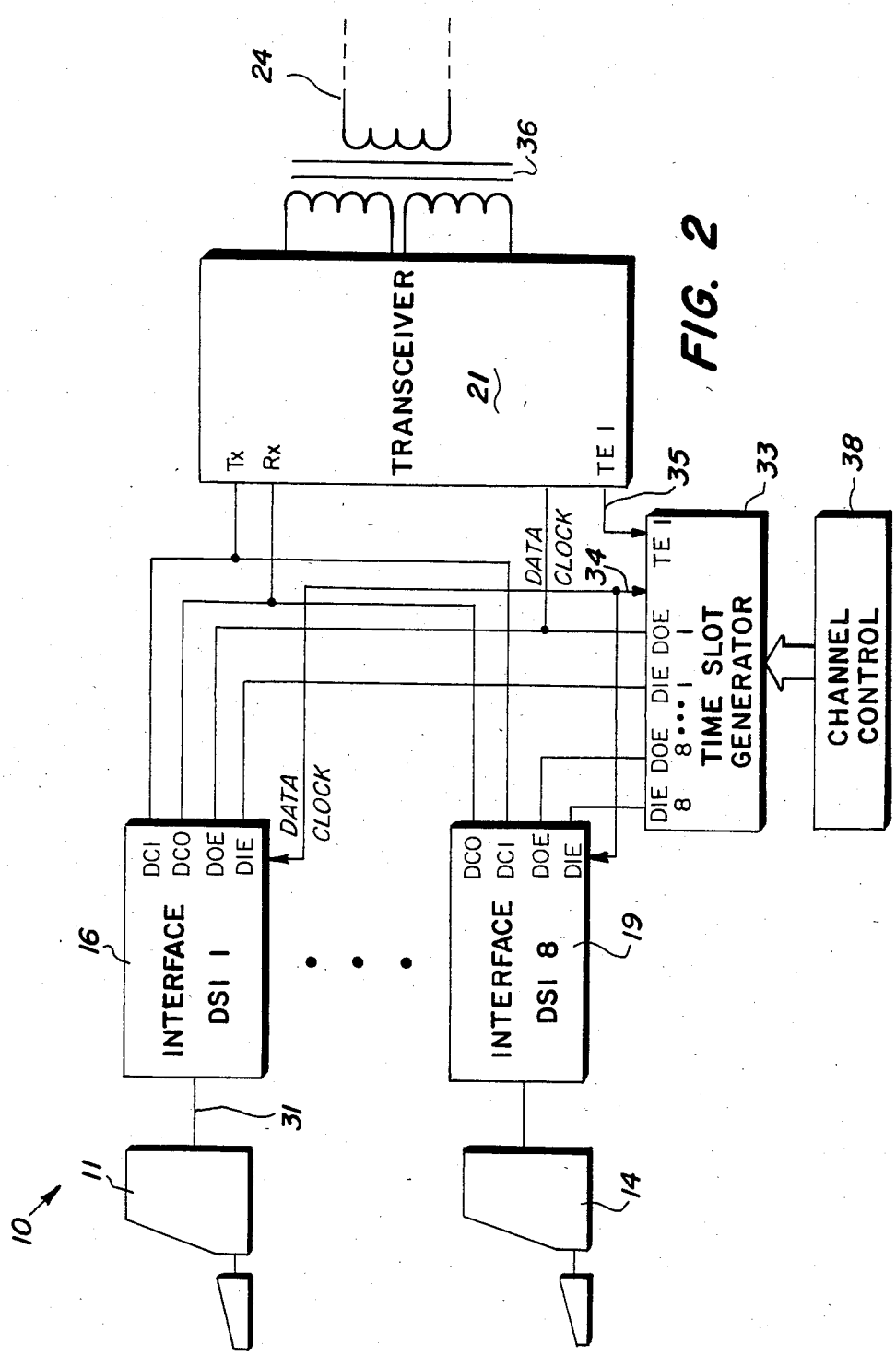
FIG. 2 further illustrates in block diagram form details of the modem of FIG. 1.

Shown in FIG. 2 is a portion of data communications system 10 showing data sources 11 and 14, interface circuits 16 and 19 and transceiver 21 in more detail. In particular, a data channel 31 is coupled between data source 11 and interface circuit 16. A data channel input terminal (DCI) of interface circuit 16 is coupled to both a data channel input terminal of interface circuit 19 and a transmit terminal (Tx) of transceiver 21. A data channel output terminal (DCO) of interface circuit 16 is coupled to both a data channel output terminal of interface circuit 19 and a receive terminal (Rx) of transceiver 21. A time slot generator circuit 33 has a first data output enable (DOE) terminal coupled to a data output enable terminal of interface circuit 16. Time slot generator circuit 33 has a first data input enable (DIE) terminal coupled to a data input enable terminal of interface circuit 16. A second data output enable terminal of time slot generator circuit 33 is coupled to a data output enable terminal of interface circuit 19. A data input enable terminal of time slot generator circuit 33 is coupled to a data input enable terminal of interface circuit 19. Transceiver 21 provides a data clock signal which is coupled to all interface circuits including circuits 16 and 19 and to time slot generator circuit 33 via a conductor 34. The data clock signal functions to clock all interface circuits and time slot generator circuit 33. A transmit enable signal (TEl) is provided by transceiver 21 and coupled to time slot generator circuit 33 via a conductor 35. Transceiver 21 has data terminals coupled to the twisted pair of wires 24 via a line transformer 36. A channel control circuit 38 is coupled to time slot generator 33.

Figure 3:
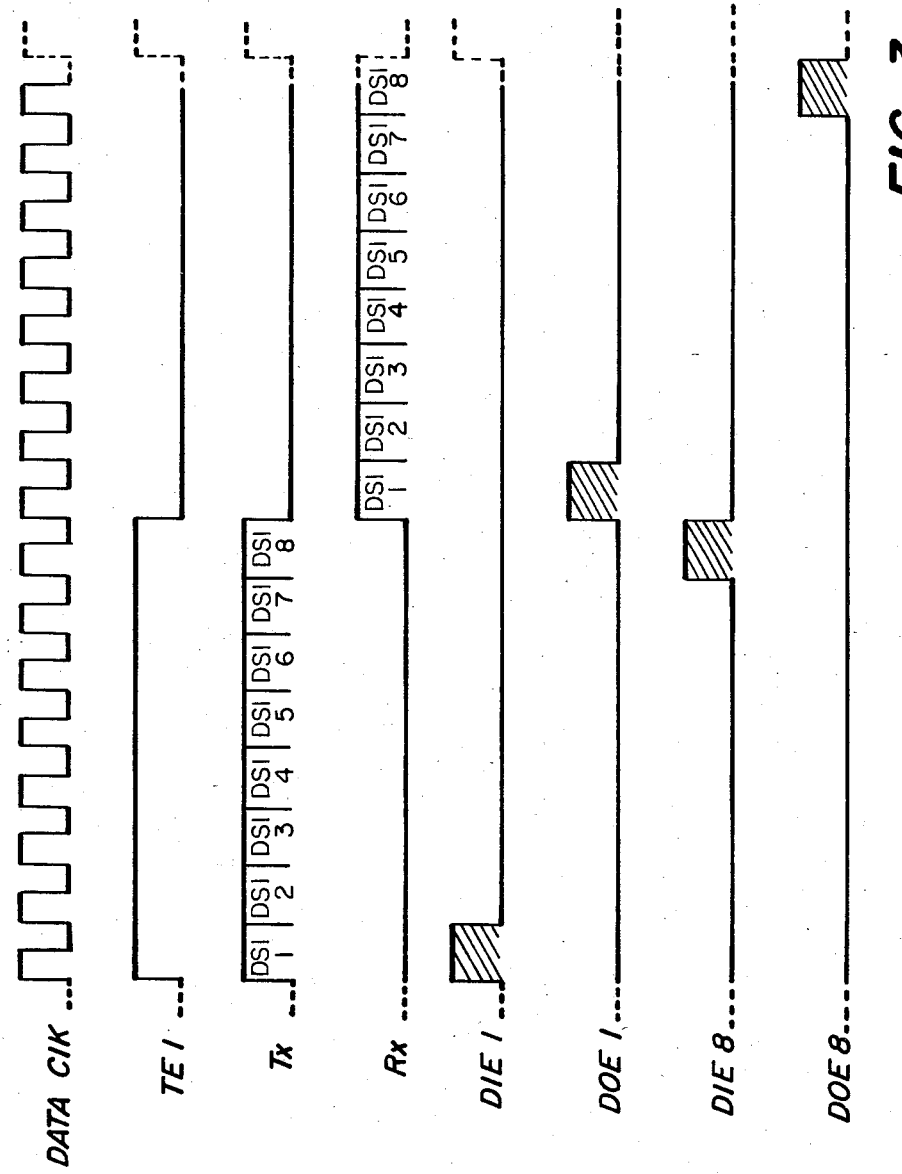
FIG. 3 illustrates in graphical form signals associated with the modem of FIGS. 1 and 2.

Referring to FIG. 3, the operation of data communication system 10 may be better understood by assuming that N equals eight so that a total of eight data sources including data sources 11 and 14 are coupled to transceiver 21 and are selectively multiplexed at the transmit terminal of transceiver 21 by time slot generator 33. Shown in FIG. 3 is the data clock provided by transceiver 21 which has a predetermined frequency. For purposes of illustration only, a preferred frequency is 128 KHz. Transmit enable signal TE1 is at a high logic level when transceiver 21 is transmitting data to a receive destination such as data computing equipment 27. The transmit enable signal is coupled to time slot generator circuit 33 which generates eight sequential data input enable signals. The first of the eight sequential data input enable signals is DIE 1 shown in FIG. 3. During the time slot in which DIE 1 changes logic level, interface circuit 16 is enabled to couple a data bit to the Rx terminal of transceiver 21. The actual logic level of signal DIE 1 is irrelevant when the signal is performing an enabling function. This is indicated in FIG. 3 by cross-hatching signal DIE 1 and all other illustrated enable signals. The last of the eight sequential data input enable signals is DIE 8. Although the six intervening data input enable signals DIE 2–DIE 6 are not shown in FIG. 3, it should be apparent that the input enable signals transition only in the Tx and Rx time slots corresponding to the time slots allocated to DSIs 2, 3, 4, 5 and 6, respectively. Therefore, as a result of the control of time slot generator circuit 33, eight consecutive data bits from eight different data sources are effectively multiplexed to the synchronous Rx data terminal of transceiver 21. Further details of the operation of interface circuits 16 and 25 may be found in U.S. Pat. No. 4,569,062.

Similarly, when transmit enable signal TE1 is at a low logic level, transceiver 21 may demultiplex multiplexed data received from a source destination such as data computing equipment 27 to predetermined data sources. In response to enable signal TE1 having a low logic level, time slot generator 33 provides eight sequential data output enable signals DOE 1–DOE 8. In response to an output enable signal, each of the eight interface circuits accepts from transceiver 21 a single receive Rx data bit respectively labeled DSI 1–DSI 8 which was transmitted from a remote source location such as transceiver 23. The boundaries of all data bits which are coupled to and from the data nodes of the plurality of the interface circuits and transceiver 21 are shown as occurring at the rising edges of the data clock signal.

It should be readily apparent that the present invention provides the ability to statically or dynamically configure a data system to accomodate various data terminals and various data rates from each of the data terminals without making hardware changes to the data system. When using the digital loop transceiver circuit taught in U.S. Pat. No. 4,432,089, the data rate of the transmit and receive channels of transceiver 21 is 64,000 bits per second which is a common telephone standard. The standard for all voice information frequency is between 0 and 4 KHz. In order to reproduce a signal within a bandwidth of 0–4 KHz, the signal must be sampled at twice the rate in accordance with the sampling theorem. Therefore, a frequency standard of 8 KHz is convenient to use with a 64 KHz channel to provide mulitiplexed channel capacity for eight channels. In a synchronous data channel, 8 KHz is equivalent to a 9.6 KHz asynchronous data channel so that data is transferred more efficiently via the synchronous data channels of transceivers 21 and 23 than via an asynchronous data channel of a data source or terminal. However, if fewer than eight channels are desired to be active at one time then it is possible to increase the data rate of predetermined ones of the data sources simply by changing the width of predetermined ones of the data input enable and data output enable signals. Those data sources which are coupled to transceiver 21 but which are inactive would have data input and data output enable signals provided by time slot generator circuit 33 which do not transition logic levels. The enable signals may be dynamically programmed by channel control circuit 38 which may be implemented in numerous forms. Examples of a few of many implementations of channel control circuit 38 include controlling the capacity via a predetermined one of the data channels, by user programmability control or by microprocessor control. When one-eighth of the channel capacity of transceiver 21 is used by any predetermined one of the data terminals, data transmission capacity of the predetermined data terminal at 9.6K baud (bits/second) or 8K baud synchronous is assured regardless of the actual data rate of all other data terminals. When one-fourth of the channel capacity of transceiver 21 is used by any predetermined one of the data terminals, data transmission capacity of the predetermined data terminal at 19.2 baud or 16K baud synchronous is assured regardless of the actual data rate of all other data terminals. Similarly, when one-half of the channel capacity of transceiver 21 is used by any predetermined one of the data terminals, data transmission of the predetermined data terminal at 38.4K baud or 32K baud synchronous is assured regardless of the actual data rate of all other data terminals.

Additional benefits of the present invention include the fact that data communication system 10 is a two-wire transmission system. Typically, modems which operate at high speeds such as 9.6K baud require four-wire systems. This feature allows the use of low cost and typically existing pairs of telephone wire. The data communication system of the present invention is a limited distance modem because of the limitations existing due to the burst mode ping-pong style of transmission which is used. However, the distance limitation is not a critical disadvantage for ping-pong style transmission at speeds up to 64K baud because a length of 2 kilometers may be used without encountering transmission errors due to time/distance delays.

By now it should be appreciated that the present invention provides a high speed limited distance multiplexed modem for use in a data communication system having a single pair of conductors. The multiplexing can be readily accomplished by merely varying clocked control signals which involves no additional switching or hardware. As a result, a flexible modem which can accomodate varying data terminals running at independent data rates is obtainable.

We claim:

1. In a data communication system for communicating data between a plurality of data sources and remote data communication equipment, each of the data sources having a data node for providing and receiving data asynchronously at a predetermined data rate, a multiplexed data communications modem, comprising:

transceiver means having a first data terminal for receiving data from the data sources in multiplexed form where data capacity of each data source is independent of data rate of all other data sources, a second data terminal for providing multiplexed data from the remote data communication equipment, and a third data terminal for synchronously communicating data between the transceiver means and the remote communication data equipment;

control means coupled to the transceiver means, for providing first and second control signals of first and second frequencies, respectively, in response to an enable signal provided by the transceiver means, said first and second control signals selectively multiplexing and demultiplexing data between predetermined ones of the plurality of data sources and the transceiver means; and a plurality of interface circuits, each of said interface circuits having a first terminal coupled to the data node of a predetermined data source for communicating data between the data source and interface circuit, a second terminal for synchronsously providing data from the data source in response to the first control signal, and a third terminal for synchronsouly receiving data from the remote data communication equipment in response to the second control signal, said first and second frequencies of the first and second control signals determining the data capacity of the respective coupled data source.

2. The multiplexed data communications modem of claim 1 wherein said plurality of data sources comprises eight data sources, each data source simultaneously communicating asynchronous data with the remote data location at substantially 9.6K bits/second.

3. The multiplexed data communications modem of claim 1 wherein the control means are programmably controlled to dynamically alter the data capacity of the data sources.

4. The multiplexed data communications modem of claim 1 wherein the control means provide a first control signal to each of the interface circuits in a sequential order during a predetermined time slot and, in response thereto, each of said interface circuits sequentially couples a data bit from a predetermined data source to the transceiver means.

5. The multiplexed data communications modem of claim 1 wherein the control means provide a second control signal to each of the interface circuits in a sequential order during a predetermined time slot and, in response thereto, each of said interface circuits sequentially couples a data bit from the remote data communication equipment to the respective data source coupled thereto.

6. The multiplexed data communications modem of claim 4 wherein said control means dynamically alter the transmit data capacity of at least a portion of the data sources by varying the time slots of the first control signals to change the data capacity of the at least a portion of said data sources.

7. The multiplexed data communications modem of claim 4 wherein said control means dynamically alter the receive data capacity of at least a portion of the data sources by varying the time slots of the second control signals to change the data capacity of the at least a portion of said data sources.

8. The multiplexed data communications modem of claim 1 wherein said transceiver means synchronously communicates data with the remote data communication equipment by using a burst mode ping-pong transmission technique via a single pair of conductors no longer than substantially two thousand meters.

9. In a data communication system for communicating data between a plurality of data sources and remote data communication equipment, a method of providing a multiplexed modem which controls data capacity of each data source, comprising the steps of:

providing a plurality of interface circuits, each of the interface circuits having a first node coupled to a predetermined data source for communicating data between the interface circuit and the predetermined data source;

coupling a second node of each interface circuit to a first node of a transceiver means, each of said second nodes providing data from a respective data source in response to a first control signal having a first frequency;

coupling a third node of each interface circuit to a second node of the transceiver means, each of said third nodes synchronously receiving data from the remote data communication equipment in response to a second control signal having a second frequency;

coupling a third node of the transceiver means to the remote communication equipment via a single pair of conductors;

coupling control means to both the interface circuit and the transceiver means, said control means multiplexing and demultiplexing data by selectively providing the first control signal at a first frequency to each interface circuit during a predetermined time slot to enable the interface circuit to sequentially couple data from the data sources to the transceiver means, and for selectively providing the second control signal at a second frequency to each interface circuit during a predetermined time slot to enable the interface circuits to synchronously receive data from the transceiver means; and controlling data capacity of each predetermined data source by controlling the frequencies of the first and second control signals.

10. The method of claim 9 further comprising the step of:

programmably controlling the control means to dynamically alter channel capacity of the data sources.

11. A multiplexed high speed data communications modem for use in a communication system having a plurality of data sources simultaneously communicating with data communication equipment up to two kilometers distant, comprising:

a plurality of interface circuits, each of the interface circuits having a first terminal coupled to a predetermined data source for communicating asynchronous data between the interface circuit and the predetermined data source, and first and second synchronous data terminals;

transceiver means having a first data terminal coupled to the first synchronous data terminal of each interface circuit to communicate data between the transceiver means and each interface circuit via a plurality of first data channels, and a second data terminal coupled to the second synchronous data terminal of each interface circuit via a plurality of second data channels; and time slot generator means coupled to the transceiver means and to each interface circuit, for selectively providing a plurality of first and second control signals which allocate channel capacity of the first and second data channels so that data channel capacity is independent of data rate, and which respectively multiplex and demultiplex data communicated between the interface circuits and the transceiver means during predetermined time slots, said time slot generator means dynamically altering transmit or receive data capacity of at least a portion of the data sources by varying the time slots of the first or second control signals, respectively, to change the data capacity of the at least a portion of the data sources.

12. The multiplexed modem of claim 11 further comprising:

progammable control means coupled to the time slot generator means, for programmably controlling the first and second control signals.

* * * * *